US007388953B2

(12) United States Patent
Gallant

(10) Patent No.: US 7,388,953 B2
(45) Date of Patent: Jun. 17, 2008

(54) METHOD AND SYSTEM FOR PROVIDING INTELLIGENT NETWORK CONTROL SERVICES IN IP TELEPHONY

(75) Inventor: John K. Gallant, Plano, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 950 days.

(21) Appl. No.: 10/099,316

(22) Filed: Mar. 15, 2002

(65) Prior Publication Data
US 2002/0131575 A1 Sep. 19, 2002

Related U.S. Application Data

(63) Continuation-in-part of application No. 09/405,409, filed on Sep. 24, 1999.

(60) Provisional application No. 60/276,923, filed on Mar. 20, 2001, provisional application No. 60/276,953, filed on Mar. 20, 2001, provisional application No. 60/276,954, filed on Mar. 20, 2001, provisional application No. 60/276,955, filed on Mar. 20, 2001.

(51) Int. Cl.
H04M 7/00 (2006.01)
(52) U.S. Cl. ............. 379/220.01; 379/219; 379/221.01
(58) Field of Classification Search ........... 379/114.15, 379/220.01, 88.18, 219; 370/385, 352; 709/229, 225; 705/26; 358/1.15; 380/282, 380/277; 707/102
See application file for complete search history.

(56) References Cited

U.S. PATENT DOCUMENTS

| 4,850,012 | A | 7/1989 | Mehta et al. |
| 5,329,578 | A | 7/1994 | Brennan et al. |
| 5,563,938 | A | 10/1996 | Soshea et al. |
| 5,928,323 | A | 7/1999 | Gosling et al. |
| 5,944,781 | A | 8/1999 | Murray |
| 6,002,689 | A | 12/1999 | Christie, et al. |
| 6,081,518 | A | 6/2000 | Bowman-Amuah |

(Continued)

FOREIGN PATENT DOCUMENTS

EP 1030503 8/2000

(Continued)

OTHER PUBLICATIONS

Handley et al. RFC 2543, SIP: Session Initiation Protocol, Network Working Group, Mar. 1999, sessions 1-7.

(Continued)

Primary Examiner—Thjuan K. Addy

(57) ABSTRACT

The present invention is directed to a telephony system that includes a first network and a second network. The system includes a first network call control system configured to provide intelligent network control services to the first network. The first network call control system is also configured to store intelligent network control data corresponding to the intelligent network control services. A second network call control system is configured to provide control services to the second network. A secure channel couples the first network call control system to the second network call control system. The secure channel is configured to securely transmit intelligent network control data from the first network call control system to the second network call control system. As a result, the second network call control system provides the intelligent network control services to the second network.

52 Claims, 8 Drawing Sheets

U.S. PATENT DOCUMENTS

| | | |
|---|---|---|
| 6,125,126 A | 9/2000 | Hallenstal |
| 6,141,341 A | 10/2000 | Jones et al. |
| 6,161,008 A | 12/2000 | Lee et al. |
| 6,163,772 A | 12/2000 | Kramer et al. |
| 6,169,805 B1 * | 1/2001 | Dunn et al. .................. 380/277 |
| 6,215,858 B1 | 4/2001 | Bartholomew et al. |
| 6,243,443 B1 | 6/2001 | Low et al. |
| 6,249,576 B1 | 6/2001 | Sassin et al. |
| 6,252,952 B1 | 6/2001 | Kung et al. |
| 6,256,389 B1 | 7/2001 | Dalrymple et al. |
| 6,282,281 B1 | 8/2001 | Low |
| 6,292,553 B1 | 9/2001 | Fellingham et al. |
| 6,333,931 B1 * | 12/2001 | LaPier et al. ................ 370/385 |
| 6,374,102 B1 | 4/2002 | Brachman et al. |
| 6,477,578 B1 * | 11/2002 | Mhoon ........................ 709/229 |
| 6,636,593 B1 * | 10/2003 | MeLampy et al. ...... 379/114.15 |
| 6,795,535 B1 * | 9/2004 | Weeren et al. ............ 379/88.18 |
| 6,823,318 B1 * | 11/2004 | Creswell et al. ............... 705/26 |
| 6,829,232 B1 * | 12/2004 | Takeda et al. ............... 370/352 |
| 6,856,676 B1 | 2/2005 | Pirot et al. |
| 6,970,566 B1 * | 11/2005 | Kimura ....................... 382/282 |
| 6,987,579 B1 * | 1/2006 | Jones et al. ................. 358/1.15 |
| 6,996,573 B2 * | 2/2006 | Syvanne ..................... 707/102 |
| 2002/0056001 A1 * | 5/2002 | Magee et al. ................ 709/225 |
| 2006/0067309 A1 | 3/2006 | Zhakov et al. |

FOREIGN PATENT DOCUMENTS

| | | |
|---|---|---|
| WO | WO 0056034 | 9/2000 |
| WO | WO 00/79756 | 12/2000 |
| WO | WO 01/10072 | 2/2001 |

OTHER PUBLICATIONS

Wedlund et al., Mobility Support using SIP, ACM 1999 1-58113-129- Jan. 8, 1999, pp. 76-82.

Chang et al., "Distributed IN Services for Mobile Agent Based Internet Telephony" IEEE, May 7, 2000, pp. 179-188.

* cited by examiner

METHOD AND SYSTEM FOR PROVIDING INTELLIGENT NETWORK CONTROL SERVICES IN IP TELEPHONY

CROSS-REFERENCE TO RELATED APPLICATIONS

This is a continuation-in-part of U.S. patent application Ser. No. 09/405,409 filed on Sep. 24, 1999, the content of which is relied upon and incorporated herein by reference in its entirety, and the benefit of priority under 35 U.S.C. §120 is hereby claimed. This application claims priority under 35 U.S.C. §119(e) based on U.S. Provisional Patent Application Ser. No. 60/276,923, filed Mar. 20, 2001, U.S. Provisional Patent Application Ser. No. 60/276,953, filed Mar. 20, 2001, U.S. Provisional Patent Application Ser. No. 60/276,954, filed Mar. 20, 2001, and U.S. Provisional Patent Application Ser. No. 60/276,955, filed Mar. 20, 2001, the contents of which are relied upon and incorporated herein by reference in their entirety.

BACKGROUND OF THE INVENTION

1. Field of the Invention

The present invention relates generally to the field of voice over packet (VoP) telephony, and more particularly to providing intelligent network control services in IP telephony.

2. Technical Background

For most of the past century or so, most telephony services have been provided by circuit switched networks. Packet switched telephony is a relatively recent development. For example, Internet telephony began in the mid 1990s with the introduction of Internet phone software. Internet telephony is the real-time delivery of voice, and other multimedia data, between two or more parties across a network using Internet protocols (IP). Internet phone software is designed to run on a personal computer equipped with a sound card, speakers, microphone, and modem or directly coupled to the internet via a LAN. Software compresses the voice signal and translates it into packets for transmission over the Internet. This basic PC-to-PC Internet telephony works, however, only if both parties are using Internet phone software.

Internet telephony, or voice over an IP network (VoIP), offers the opportunity to design a global multimedia communications system that may eventually replace the existing circuit switched telephony infrastructure. In a relatively short period of time, Internet telephony has made significant advances. Many software developers now offer PC telephony software. Internet telephony involves establishing a communications session between two logical addresses in the network. Generally, a first Internet protocol, such as H.323 or Session Initiation Protocol (SIP) is used to establish the session and negotiate the capabilities for the session, and a second Internet protocol, such Real-time Transport Protocol (RTP), is used to transport the actual media across the IP network.

While packet switched telephony offers benefits to both users and carriers in terms of cost and variety of media types, there is a substantial installed base of traditional telephones served by the public switched telephone network (PSTN). Moreover, in addition to its widespread nature, the PSTN offers a rich set of intelligent network services such as "800" number services, Virtual Private Network (VNET) services, call forwarding, and the like. IP telephony and the PSTN will co-exist for a period of time. Thus, there is a desire to integrate the PSTN with IP networks, including the Internet and private intranets.

The evolution of the integration of the PSTN and packet-switched telephony can be seen in FIG. 1 and FIG. 2. FIG. 1 shows two separate self-contained networks, PSTN 100 and packet-switched network 1. Each includes separate call control resources, and each includes separate transport facilities. In the example depicted in FIG. 1, PSTN 100 provides virtual private network (VNET) services for a customer having two sites. A circuit is established between PBX 14 and PBX 14' by way of switches 102. Dial plan information, number translations, and all of the other call control data required to maintain the VNET is provided by legacy service control entity 40. Packet-switched network 1 allows packet-switched telephony sessions to be established between IP telephones 18 and IP telephones 18'. IP telephones 18 are coupled to router 8, whereas IP telephones 18' are coupled to router 8'. Call control is provided by call control proxy server 20. Location manager 30 stores dial plan information, user profiles, and other data required by control entity 20 to establish and maintain packet switched telephony sessions. While call control server 20 and location manager 30 may be implemented as shown, e.g., as two separate systems running on two or more hardware components, those of ordinary skill in the art will recognize that call control server 20 and location manager 30 may be combined into one logical and/or physical system. A SIP server is the generic term used for a server having the combined functionality of call control server 20 and the location manager 30.

FIG. 2 shows the first stage in forming an integrated network 10. Enterprise gateways 16 are introduced to couple PBXs 14 with router 8. Gateways 16 allow cross-over calls among telephones 12 coupled to PBX 14 and IP telephones 18. Both signaling and media translations are handled by gateways 16. Thus, calls originating at PSTN-based telephone 12, can be partially transported by IP network 1 for eventual delivery to a second phone, either IP telephone 18, or PBX telephone 12', coupled to PBX 14'. Unfortunately, there are limitations to the integrated system depicted in FIG. 2. While the integrated network depicted in FIG. 2 permits calls to cross-over between networks, call control data is segregated and not shared by the individual networks.

One problem associated with the integrated system depicted in FIG. 2 relates to the difficulties associated with supporting a VNET (or other legacy system services) when the customer has facilities spanning both PSTN 100 and the IP network 1. One approach that has been considered is to maintain two intelligent network systems; one for each network. However, the use of duplicate intelligent network systems is problematic. Legacy call control entity 40 and location manager 30 must be synchronized at all times. Ensuring that both systems have identical sets of data is logistically very challenging. If one system diverges from the other system even momentarily, calls may be mis-routed, perhaps even being directed from one VNET to an entirely different VNET. Thus, it is desirable to support a given customer from a single body of call control data. Because the legacy call control system is well established, what is needed is a way of importing legacy based call control data into the IP network. However, there is a drawback associated with this approach.

In the PSTN, signaling information and message payloads (e.g., voice) are carried by different systems. One drawback to providing PSTN-based intelligent network services to IP telephony calls is related to the fact that both signaling information and message payloads are delivered by the same vehicle, e.g., a packet. As a result, IP telephony has several types of security issues that are not present in the PSTN. One type of security attack is commonly referred to as IP spoofing. IP spoofing is an attempt to gain access to the network, and network services, by changing a packet's IP address to make it appear that the packet came from a legitimate network address. Another security issue involves co-opting a session by manipulating a packet's header or IP data payload. What is needed is a secure method and system for providing all of the PSTN-based intelligent network services to IP telephony calls.

SUMMARY

The present invention is directed to a method and system for accessing legacy based call control data from an IP network. In doing so, the present invention also provides a secure method and system for providing all of the PSTN-based intelligent network services to IP telephony calls.

One aspect of the present invention is a telephony system that having a first transport network and a second transport network. The system includes a first network call control system configured to provide intelligent network control services to the first network. The first network call control system also is configured to store intelligent network control data corresponding to the intelligent network control services. A second network call control system is configured to provide control services to the second network. A secure channel couples the first network call control system to the second network call control system. The secure channel is configured to securely transmit intelligent network control data from the first network call control system to the second network call control system, whereby the second network call control system provides the intelligent network control services to the second network.

In another aspect, the present invention includes a telephony system having a first network and a second network. The system includes a first network call control system configured to store intelligent network control data. The first network call control system is configured to use intelligent network control data to provide intelligent network services to the first network. At least one second network IP telephony proxy server is configured to provide call control services to the second network. A second network location manager is coupled to the second network IP telephony proxy server. The second network location manager is configured to perform IP address mapping in the second network. A secure channel couples the first network call control system to the second network location manager. The secure channel is configured to securely transmit intelligent network service control data from the first network service control system to the second network location manager, whereby intelligent network control services are provided to the second network.

In another aspect, the present invention includes a method for providing a second network with intelligent network service control data stored in a first network service control system. The method includes the step of receiving an IP telephony session initiation request at a second network IP proxy server. It is then determined whether intelligent network service information is necessary to initiate the session. The IP telephony session initiation request is transmitted from the second network IP proxy server to a second network location manager, if it is determined that intelligent network service information is necessary to initiate the session. A secure channel is created between the second network location manager and the first network service control system. The secure channel is configured to securely transfer the intelligent network service control data from the first network service control system to the second network location manager.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
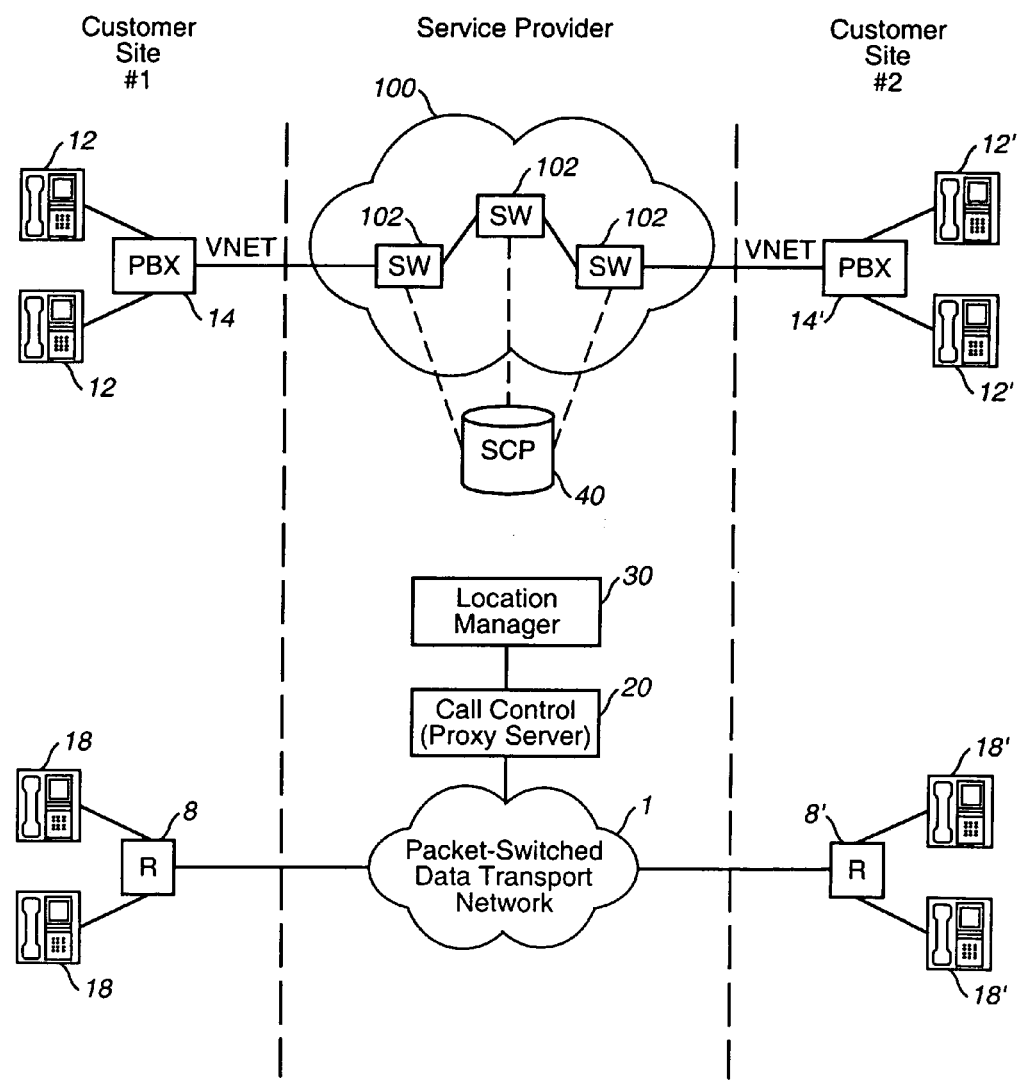
FIG. 1 is a block diagram showing the PSTN and a packet-switched network before integration.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the telephony system of the present invention is shown in FIG. 3, and is designated generally throughout by reference numeral 10.

In accordance with the invention, the present invention is directed to a telephony system that includes a first network and a second network. The system includes a first network call control system configured to provide intelligent network control services to the first network. The first network call control system is also configured to store intelligent network control data corresponding to the intelligent network control services. A second network call control system is configured to provide control services to the second network. A secure channel couples the first network call control system to the second network call control system. The secure channel is configured to securely transmit intelligent network control data from the first network call control system to the second network call control system. As a result, the second network call control system provides the intelligent network control services to the second network. Thus, the present invention provides a secure system and method for providing PSTN-based intelligent network services to IP telephony calls.

Figure 3:
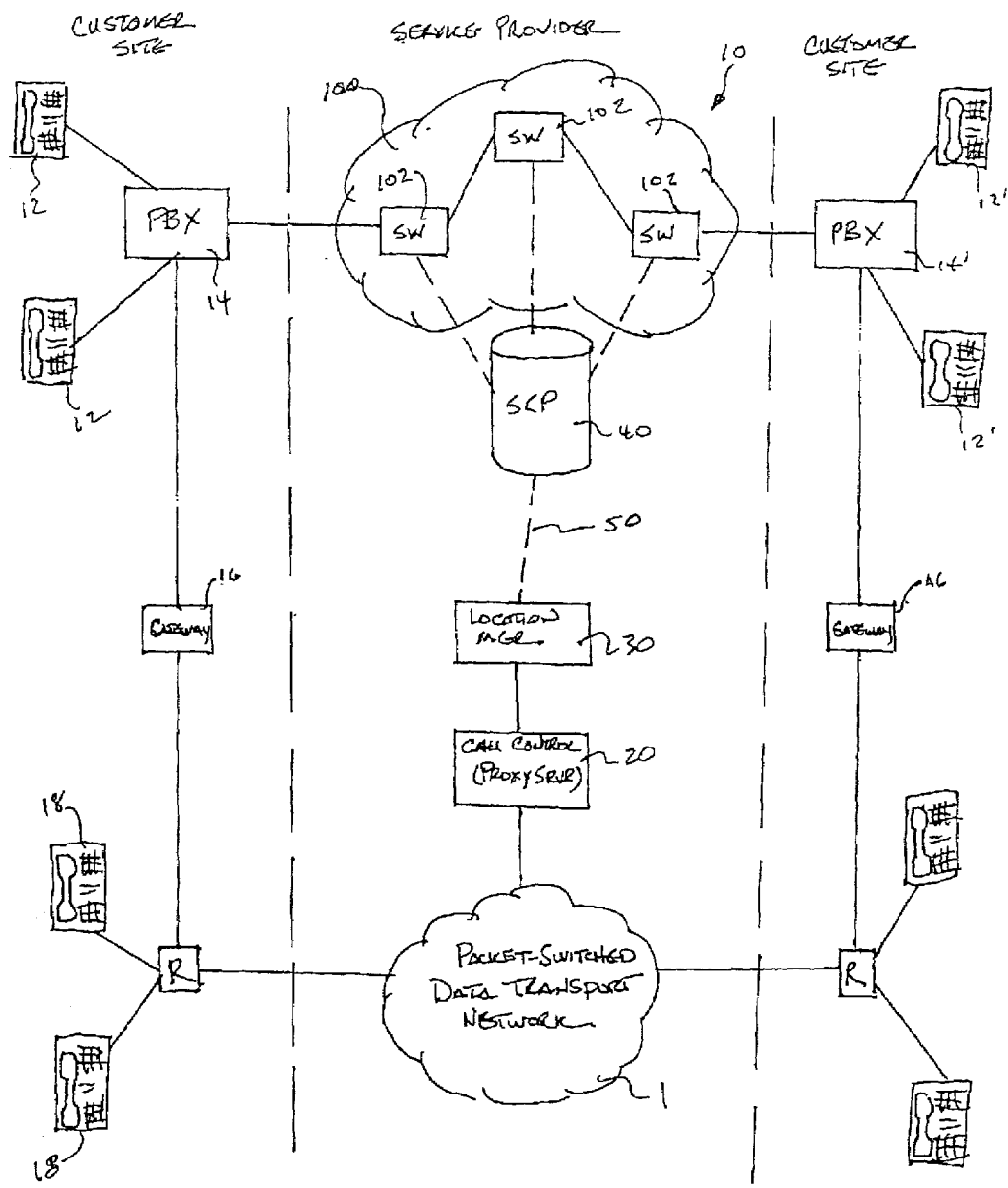
FIG. 3 is a block diagram of an integrated network in accordance with a first embodiment of the present invention.

As embodied herein and depicted in FIG. 3, a block diagram of integrated network 10 in accordance with a first embodiment of the present invention is disclosed. FIG. 3 represents another stage in the integration of PSTN network 100 with IP network 1. In this embodiment, channel 50 is disposed between legacy service control entity 40 and location manager 30. As discussed in more detail below, channel 50 enables existing VNET functionality in PSTN 100 to be accessed by, and used in IP network 1. Thus, only one image of intelligent network control data need be maintained.

Figure 4:
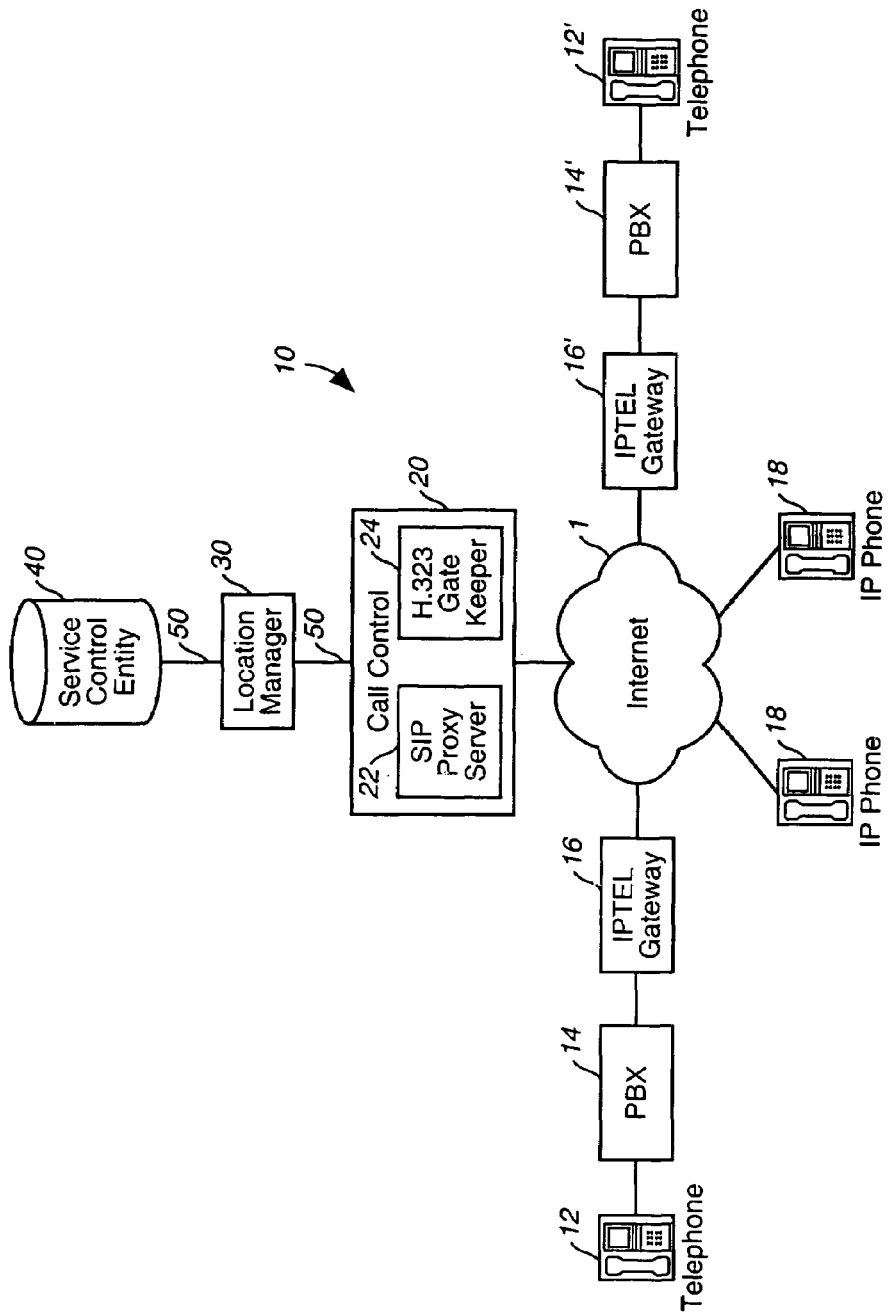
FIG. 4 is a detailed depiction the integrated system depicted in FIG. 3.

FIG. 4 is a detailed depiction of the integrated system 10 depicted in FIG. 3. The system 10 is adapted to provide telephony services between and among subscribers using traditional telephones 12 and Internet telephones 18. The signaling and media for calls according to the present invention are transported at least in part over packet switched network 1.

Traditional telephones 12 are connected to IP network 1 through traditional telephone switching equipment, such as PBXs 14 and IP telephony gateways 16. IP telephony gateways 21 each include a signaling gateway (not shown) and a media gateway (not shown). The signaling gateway provides bi-directional translation between PSTN telephony signaling, such as SS7, messages and IP telephony signaling messages in protocols such as H.323, Session Initiation Protocol (SIP), or others. The media gateway provides bi-directional conversion between time division multiplexed (TDM) signals and IP transport packets in a protocol such as real-time transport protocol (RTP). IP phones 18 may be connected directly to be Internet through a local area network or by modem connection through an Internet service provider.

Generally, call signaling and media are transported across Internet 1 between an ingress IP telephony gateway 16 and an egress IP telephony gateway 16'. Typically, routing information is supplied by a proxy server, such as a SIP proxy server 22 or an H.323 gatekeeper 24. In the SIP protocol, an INVITE message is sent from the ingress IP telephony gateway 16 to the SIP proxy server 22 specifying a called party. IP call setup signaling messages are transported back and forth between the IP telephony gateways 16 and the SIP proxy server 22 until the call is setup. In FIG. 4, the SIP proxy server 22 and the H.323 gatekeeper 24 are shown as being combined in a call control entity 20. As shown, SIP proxy server 22 and H.323 gatekeeper 24 are peer-to-peer control elements. In another embodiment, these control elements are configured in a hierarchical architecture. Thus, call control server 20 includes H.323/SIP converters, such that SIP is the higher-level protocol and the routing information is converted into SIP.

The proxy servers 22 and 24 cannot, by themselves, handle calls that require intelligent network services. Examples of calls requiring intelligent network services are "800" number calls, Virtual Private Network (VNET) calls, local number portable calls, call forwarded calls, and the like. In traditional PSTN telephony, switches consult service control entities, known as service control points (SCPs), for routing information, such as number translation, in order to route calls properly.

The system 10 makes use of a legacy PSTN system service control entity indicated generally at 40, which may be a SCP or a DAP. The system 10 includes a location manager 30, which provides alias resolution, gateway selection, and mobility management services to the call control entity 20, as well as accessing the service control entity 40 for such services as VNET and local number portability services on behalf of the call control entity 20.

The location manager 30 functions as a SIP redirect server. A redirect server is a server that accepts a SIP request, maps the requested party into zero or more addresses and returns these addresses to the proxy server 22. For normal calls that do not require intelligent network services, the location manager 30 knows the address of the called party at the egress IP telephony gateway 16' and returns these addresses to the proxy server 22. For calls that do require intelligent network services, the location manager 30 accesses the legacy service control entity 40 to obtain address information for the called party, if necessary. The location manager 30 then returns the address information to the appropriate server of the call control entity 40. In one embodiment of the present invention, requests from the location manager 30 to legacy service control entity 40 are completely transparent to legacy service control entity 40. Inn other words, legacy service control entity 40 cannot determine if the request came from location manager 30 or from a PSTN entity. When location manager 30 sends a request, it employs a numbering pan that emulates a PSTN address. Service control entity has no knowledge of IP addresses whatsoever. Responses received by location manager 30 are PSTN addresses. Thus, in this embodiment, location manager 30 is equipped with a table that cross-maps PSTN addresses, such as Switch-ID/trunk-groups, into IP addresses. One salient feature of this embodiment is that the PSTN is unaltered, and there is no virtually impact on the PSTN. However, in another embodiment, legacy service control entity 40 is reconfigured to recognize IP addresses. In this embodiment, both network call control systems are modified.

In one embodiment of the present invention, the H.323 gatekeeper 24 provides adaptation among SIP and H.323 protocols. Thus, the H.323 gatekeeper 24 communicates with H.323 IP telephony gateways and Internet appliances in the H.323 protocol, and with SIP IP telephony gateways, Internet appliances, and the location manager 30 in the SIP protocol.

Figure 5:
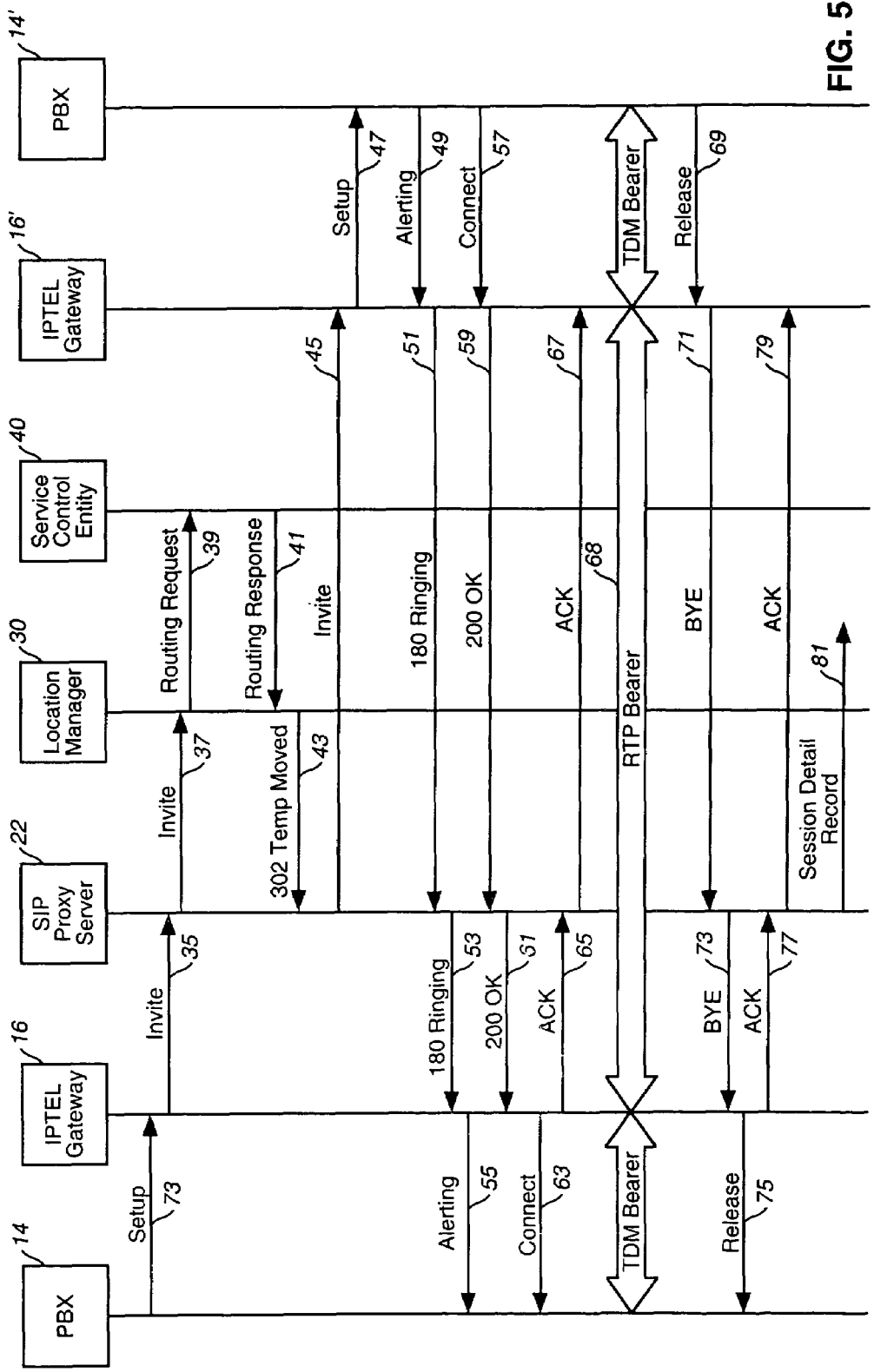
FIG. 5 is a call flow diagram for processing a virtual private network (VNET) call according to one embodiment of the present invention.

Referring now to FIG. 5, the PBX 14 sends a setup message 33 to the IP telephony gateway 16. The IP telephony gateway 16 maps the setup messages 33 into a SIP INVITE request 35 addressed to the SIP proxy server 22. The SIP proxy server 22 is unable by itself to process setup for a VNET call. Accordingly, the SIP proxy server 22 sends a SIP INVITE request 37 to the dialed number at the location manager 30.

Upon receipt of the INVITE request 37, the location manager 30 queries the service control entity 40 with a routing request 39. The service control entity 40 performs a data lookup and responds to the location manager 30 with a routing response 41. The location manager 30 maps response 41 into a SIP 302 TEMPORARILY REMOVED RESPONSE 43, directed back to SIP proxy server 22. The response 43 provides the SIP proxy server 22 with an IP address for the called party at the egress IP telephony gateway 16'. Accordingly, the SIP proxy server 22 sends an INVITE request 45 to the called party at the egress IP telephony gateway 16'.

Upon receipt of the INVITE 45, the egress IP telephony gateway 16' sends a setup message 47 to the PBX 14'. When the PBX 14' rings the line of the called party, the PBX 14' sends an alerting message 49 back to the egress IP telephony gateway 16'. The egress IP telephony gateway 16' then sends a SIP 180 RINGING message 51 back to the SIP proxy server 22, which in turn sends a SIP 180 RINGING response 53 to the ingress IP telephony gateway 16. The ingress IP telephony gateway 16 then sends an alerting message 55 to the PBX 14, which provides a ringing tone to the caller party. When the called party answers, PBX 14' sends a connect message 57 to the egress IP telephony gateway 16'. The egress IP telephony gateway 16' in turn sends a SIP 200 OK response 59 to the SIP proxy server 22. The proxy server 22 sends a 200 OK response 61 to the ingress IP telephony gateway 16. Upon receipt of the response 61, the ingress IP telephony gateway 16 sends a connect message 63 to the PBX 14 and a SIP ACK request 65 to the SIP proxy server 22. The SIP proxy server 22 sends an ACK request 67 to the egress IP telephony gateway 16' and the VNET session is established.

Once the VNET session is established, packets are then transported across IP network 1 via the RTP bearer 68. RTP provides end-to-end delivery services (e.g., between gateway 16 and gateway 16') for data having real-time characteristics, such as interactive voice. The RTP header contains timing information and a sequence number that allow the receiver to reconstruct the timing produced by the source. Timing reconstruction is performed separately for each source of RTP packets in a session. The sequence numbers can also be used by a receiver to estimate how many packets are being lost. Note that enterprise gateways 16 provide the interface between packet switched network 1, and the circuit switched environment in PBXs 14.

At the conclusion of the VNET session, the called party hangs up and the PBX 14' sends a release message 69 to the egress IP telephony gateway 16'. The egress IP telephony gateway 16' maps release 69 into a SIP BYE request 71 addressed to the calling party at SIP proxy server 22. The SIP proxy server 22 then sends a BYE request 73 to the calling party at the ingress IP telephony gateway 16. The ingress IP telephony gateway 16 sends a release message 75 to the PBX 14 to terminate the call. The ingress IP telephony gateway 16 also sends an ACK request 77 to the SIP proxy server 22. The SIP proxy server 22 sends an ACK request 79 back to the egress IP gateway 16'. The SIP proxy server 22 also sends a session detail record 81 to an appropriate billing authority.

Figure 6:
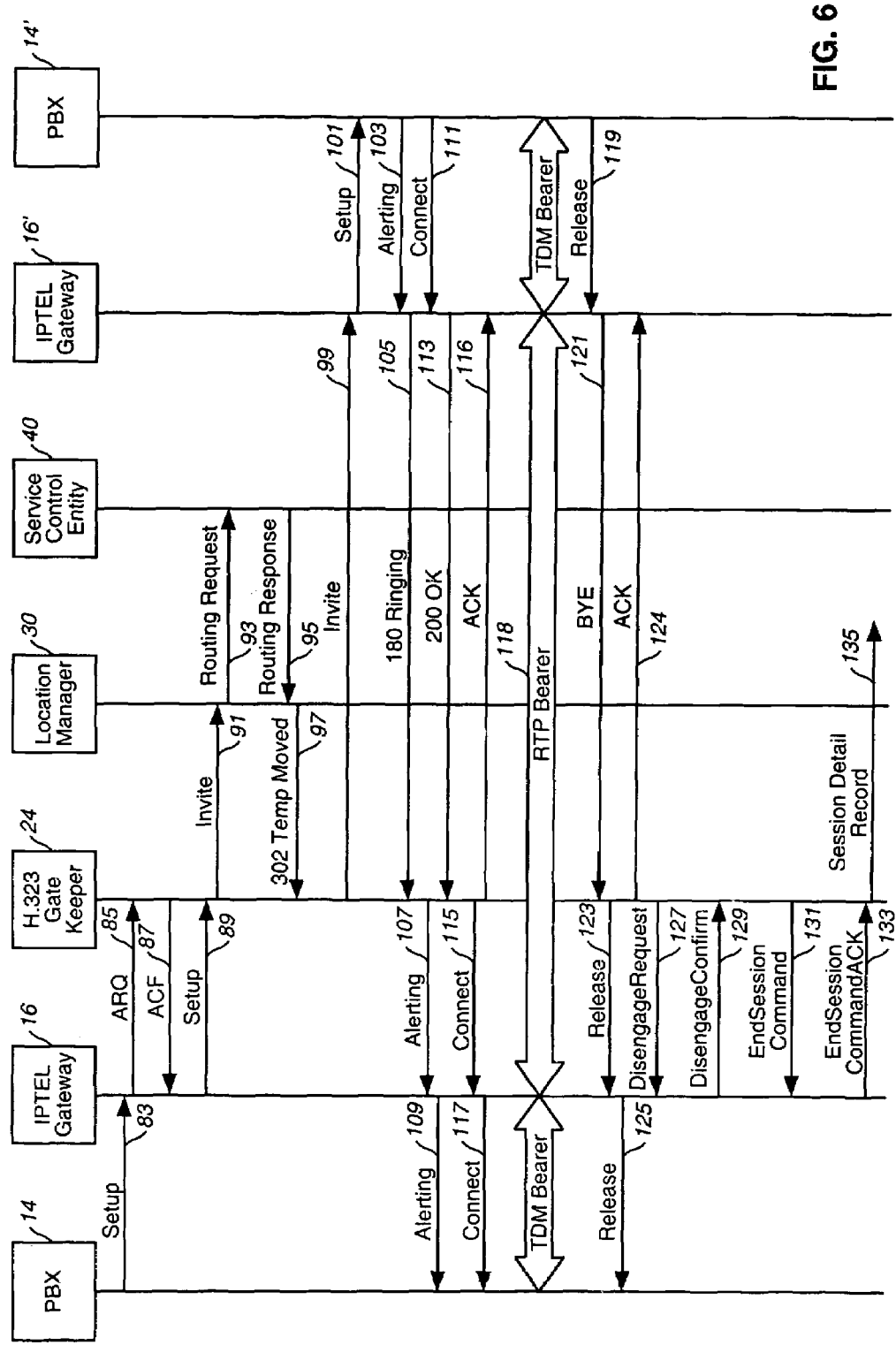
FIG. 6 is a call flow diagram for processing a virtual private network (VNET) call according to an another embodiment of the present invention.

Referring now to FIG. 6, in which the signaling gateway of the ingress IP telephony gateway 16 uses the H.323 protocol. The PBX 14 sends a setup message 83 to the ingress IP telephony gateway 16. The ingress IP telephony gateway 16 maps the setup message 83 into an H.323 ARQ message 85 addressed to the H.323 gatekeeper 24. The H.323 gatekeeper 24 responds to message 85 with an H.323 ACF message 87. Upon receipt of message 87, the ingress IP telephony gateway 16 sends an H.323 setup message 89 to gatekeeper 24. The H.323 gatekeeper 24 is unable by itself to process setup for a VNET call. Accordingly, the H.323 gatekeeper 24 sends a SIP INVITE request 91 to the dialed number at the location manager 30.

Upon receipt of INVITE request 91, the location manager 30 queries the service control entity 40 with routing request 93. The service control entity 40 performs a data lookup and responds to the location manager 30 with a routing response 95. The location manager 30 determines that the call should be routed to the called party at the egress IP telephony gateway 16' and sends a SIP 305 temporarily moved response 97 back to the H.323 gatekeeper 24. The H.323 gatekeeper 24 sends a SIP INVITE request 99 to the called party at the egress IP telephony gateway 16'. Upon receipt of the SIP INVITE request 99, the egress IP telephony gateway 16' sends a setup message 101 to the PBX 14'. When the PBX 14' rings the line of the called party, the PBX 14' sends an alerting message 103 back to the egress IP telephony gateway 16'. The egress IP telephony gateway 16' then sends a SIP 180 ringing message 105 back to the H.323 gateway keeper 24, which in turn sends a H.323 alerting message 107 to the ingress IP telephony gateway 16. The ingress IP telephony gateway 16 then sends an alerting message 109 to PBX 14, which provides a ringing tone to the calling party. When the called party answers, the PBX 14' sends a connect message 111 to the egress IP telephony gateway 16'. The egress IP telephony gateway 16' in turn sends a SIP 200 OK response 113 to the H.323 gatekeeper 24. The H.323 gatekeeper 24 sends an H.323 connect message 115 to the ingress IP telephony gateway 16 and a SIP ACK request 116 back to the egress IP telephony gateway 16'. Upon receipt of the message 115, the ingress IP telephony gateway 16 sends a connect message 117 to the PBX 14 and the VNET session is established.

After the VNET session is established, packets are transported across IP network 1 via the RTP bearer 118. As discussed above with respect to FIG. 5, RTP bearer 118 provides end-to-end packet delivery services (e.g., between gateway 16 and gateway 16') for the session. Again, it is noted that enterprise gateways 16 provide the interface between packet switched network 1, and the circuit switched environment in PBXs 14.

At the conclusion of the VNET session, the called party hangs up and the PBX 14' sends a release message 119 to gateway 16'. Gateway 16' maps release 119 into a SIP BYE request 121 addressed to the calling party at the H.323 gatekeeper 24. The H.323 gatekeeper 24 then sends an H.323 release message 123 to the calling party at the ingress IP telephony gateway 16 and a SIP ACK request 124 back to the egress IP telephony gateway 16'. The ingress IP telephony gateway 16 sends a release message 125 to the PBX 14 to terminate the call. According to the H.323 protocol, at the conclusion of the session, the H.323 gatekeeper 24 sends a disengage request 127 to the ingress IP telephony gateway 16, which responds with a disengage confirm 129. Then the H.323 gatekeeper 24 sends an end session command 131 to the ingress IP telephony gateway 16, which responds with an end session command ACK 133. The H.323 gatekeeper 24 then sends a session detail record 135 to the appropriate billing authority.

Figure 7:
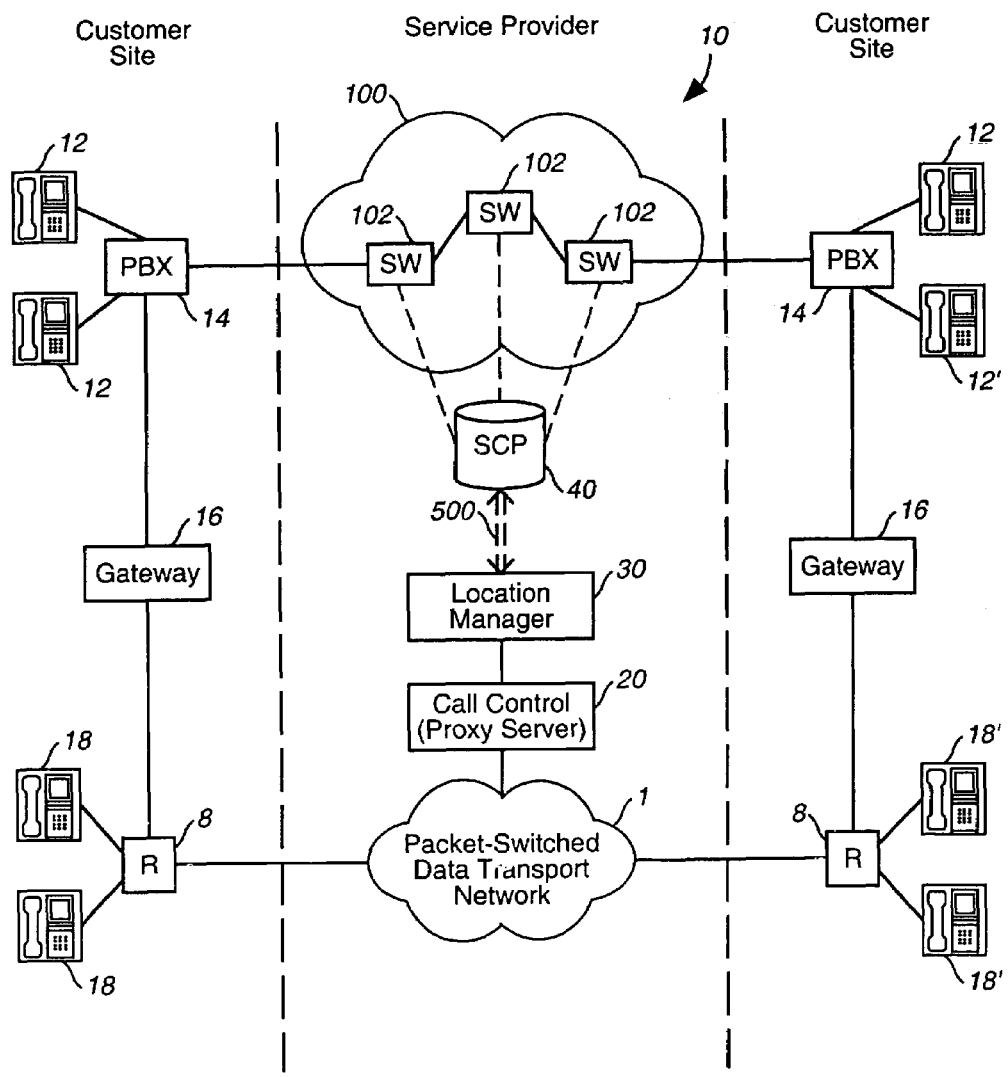
FIG. 7 is a block diagram of an integrated network in accordance with a second embodiment of the present invention.

As embodied herein and depicted in FIG. 7, an alternate embodiment of system 10 is shown. The descriptions of PSTN 100, IP Network 1, call control entity 20, location manager 30, and service control entity 40 provided above with respect to FIGS. 3-6, are equally applicable to FIG. 7. The embodiment depicted in FIG. 7 differs from the embodiments depicted in FIGS. 3-6, in that channel 50 is replaced by secure channel 500 to couple PSTN network service control entity 40 to the IP network location manager 30. Secure channel 500 is configured to securely transmit intelligent network control data from service control entity 40 to location manager 30, enabling location manager 30 to provide call control entity 20 with PSTN-based intelligent network control services data. Secure channel 500 addresses many, if not all, of the security issues related to providing PSTN-based intelligent network services to IP telephony calls. Thus, security problems such as spoofing, eavesdropping, and attempts to co-opt a session by manipulating a packet's header or IP data payload, can substantially be eliminated.

Figure 2:
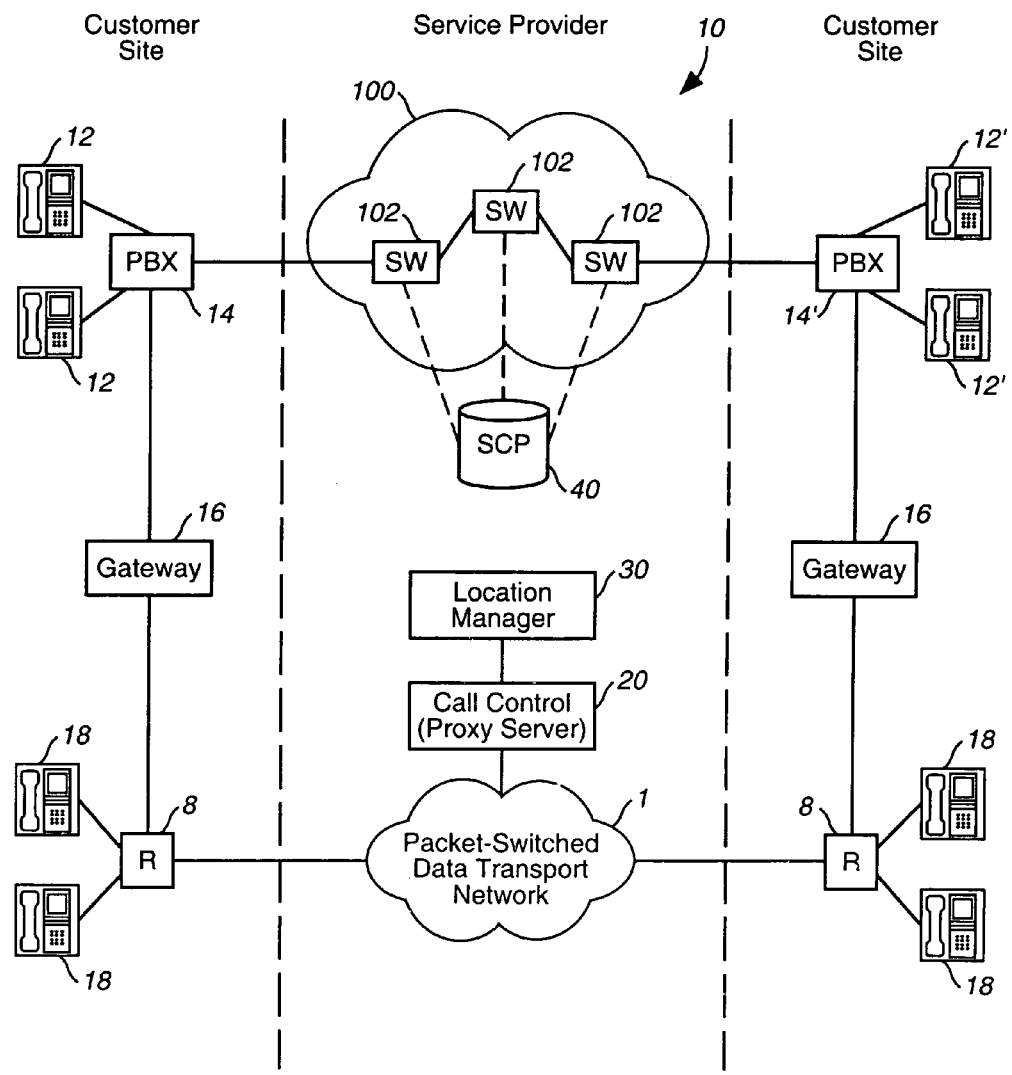
FIG. 2 is a block diagram showing the first stage of an integrated network.
Figure 8:
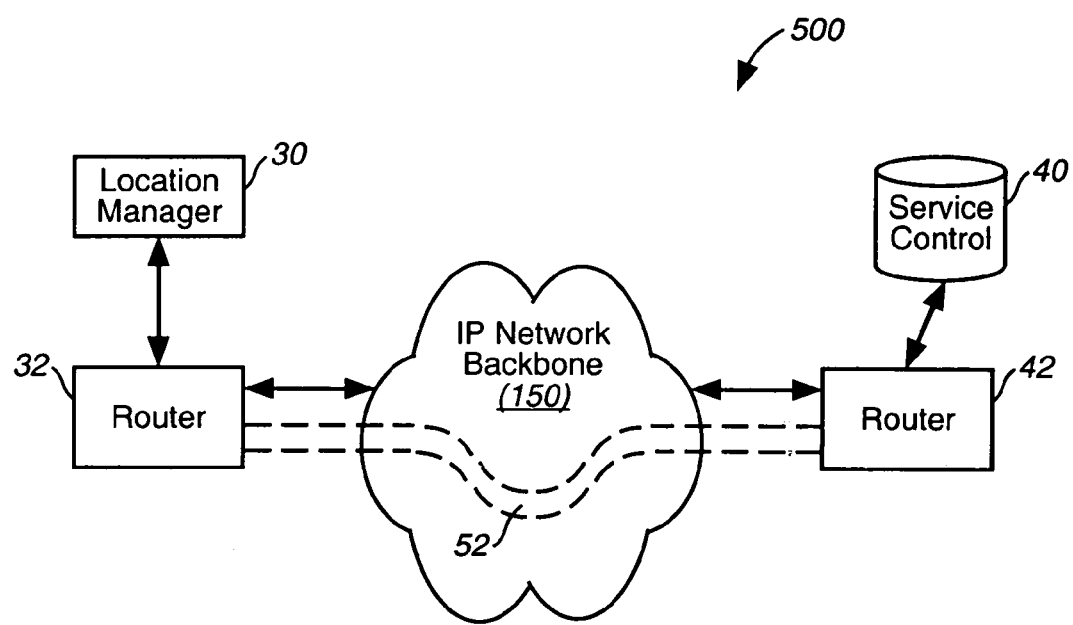
FIG. 8 is a block diagram of a secure channel established between the location manager and the service control entity depicted in FIG. 7.

Referring now to FIG. 8, a block diagram of secure channel 500, established between location manager 30 and service control entity 40, is disclosed. Location manager 30 is connected to router 32. Router 32 is coupled to IP network backbone 150. IP network backbone transports packets between router 32 and router 42. Security tunnel 52 is implemented by encapsulating the packets carrying intelligent network service data in backbone 150. Router 42 is bi-directionally connected to service control entity 40. Referring back to FIG. 2 and FIG. 3, and the associated text, when VNET data is transferred between location manager 30 and service control entity 40, security tunnel 52 is employed.

Security tunnel 52 may be of any suitable type, but there is shown by way of example, an IPsec tunnel implemented on router 32 and router 42. Those of ordinary skill in the art will recognize that IPsec is a suite of protocols developed by IETF. IPsec includes the authentication header (AH) protocol and the encapsulating security payload (ESP) protocol. Security tunnel 52 refers to a method of encapsulating an original packet into a tunnel packet. The tunnel packet provides the necessary routing information to enable the packet to travel between router 32 and router 42, without revealing that the actual source or destination of the packet is actually location manager 30, or service control entity 40, depending on the flow of information.

Use of the authentication header (AH) protocol provides a very high degree of confidence that a packet has not been altered or tampered with during transmission. The AH protocol allows the receiver of a packet to verify the packet's sender. In doing so, the AH protocol may employ MD5, the U.S. Government's secure hash algorithm, or any other suitable algorithm. The AH protocol can also be used in combination with the ESP when the packet payload requires confidentiality. ESP is a protocol that uses symmetric cryptographic algorithms to encrypt IP data at the packet level. For example, a 56 bit data encryption standard (DES) algorithm may be used to encrypt the payload. In a preferred embodiment of security tunnel 52, the ESP protocol is employed because it is desirable to both provide packet authentication, and to encrypt the intelligent network service data carried in the packet payload. In one embodiment, an ESP protocol is provided having non-null encryption, authentication, and replay attack prevention modes enabled.

In one embodiment, the physical connection between router 32 and router 42 includes a fiber disposed within a single Point of Presence (PoP) in a central office site. However, the physical connection maybe any reliable path between router 32 and router 42 within IP backbone 150, if collocation is not possible. For example, the physical path may be implemented using a long-haul reliable TDM link.

Router 32 and router 42 may be of any suitable type, but there is shown by way of example a router of the type manufactured by CISCO. Cryptographic keys for each tunnel may be manually configured into the routers. Any packets that do not authenticate will be dropped. The routers may also be configured to track the number of packets that are dropped for failure to authenticate.

IP network backbone 150 may be of any suitable type, but there is shown by way of example a network that includes a nationwide high speed network that operates at 622 MB/sec (OC-12). Backbone 150 may employ advanced packet switching technology commonly known as the Asynchronous Transfer Mode (ATM). Backbone 150 may also utilize a fiber-optic transmission technology referred to as the Synchronous Optical Network (SONET). The combination of ATM and SONET enables high speed, high capacity voice, data, and video signals to be combined and transmitted on demand. The high speed of backbone 150 is achieved by connecting Internet Protocol through the ATM switching matrix, and running this combination on the SONET network.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A telephony system including a first network and a second network, the system comprising:
 a first network call control system configured to provide intelligent network control services to the first network, the first network call control system also being configured to store intelligent network control data corresponding to the intelligent network control services, the first network call control system comprising a legacy telephony service control system;
 a second network call control system configured to provide control services to the second network, the second network call control system emulating a first network system such that communications between the legacy telephony service control system and the second network call control system are transparent to the legacy telephony service control system; and
 a secure channel coupling the first network call control system to the second network call control system, the secure channel being configured to securely transmit intelligent network control data from the first network call control system to the second network call control system, the second network call control system providing the intelligent network control services to the second network.

2. The system of claim 1, wherein the first network comprises a circuit switched network.

3. The system of claim 1, wherein the second network comprises a packet switched network.

4. The system of claim 1, wherein the first network call control system comprises a service control point (SCP).

5. The system of claim 1, wherein the first network call control system includes a data access point (DAP).

6. The system of claim 1, wherein the intelligent network control services include virtual private network (VNET) services.

7. The system of claim 1, wherein the intelligent network control services include 800-number network services.

8. The system of claim 1, wherein the intelligent network control services include call forwarding network services.

9. The system of claim 1, wherein the intelligent network control services include private dialing plan features.

10. The system of claim 1, wherein the intelligent network control services include customized message announcement features.

11. The system of claim 1, wherein the intelligent network control services include network call redirect services.

12. The system of claim 1, wherein the intelligent network control services include VNET network management services.

13. The system of claim 1, wherein the secure channel comprises a logical data path between the first network call control system and the second network call control system.

14. The system of claim 1, wherein the secure channel comprises an IP security tunnel between the first network call control system and the second network call control system.

15. The system of claim 14, wherein the IP security tunnel is established using an authentication header (AH) protocol.

16. The system of claim 15, wherein the IP security tunnel is established using an encapsulating secure payload (ESP) authentication header protocol.

17. The system of claim 16, wherein the encapsulating secure payload authentication header protocol includes an enabled non-null encryption mode.

18. The system of claim 16, wherein the encapsulating secure payload authentication header protocol includes an enabled replay attack prevention mode.

19. The system of claim 15, wherein the IP security tunnel is established using a cryptographically hashed authentication protocol.

20. The system of claim 19, wherein the cryptographically hashed authentication protocol employs an MD5 hash algorithm.

21. The system of claim 15, wherein the IP security tunnel includes an IP network physical layer.

22. The system of claim 21, wherein the IP network physical layer further comprises:
a first network router coupled to the first network intelligent network service control system, the first network router being configured to support an IP security tunnel protocol;
a second network router coupled to the second network call control system, the second network router being configured to support an IP security tunnel protocol; and
a packet switched network coupling the first network router and the second network router.

23. A telephony system including a first network and a second network, the system comprising:
a first network call control system configured to store intelligent network control data, the first network call control system being configured to use intelligent network control data to provide intelligent network services to the first network;
at least one second network IP telephony proxy server configured to provide call control services to the second network;
a second network location manager coupled to the second network IP telephony proxy server, the second network location manager being configured to performing IP address mapping in the second network; and
a secure channel coupling the first network call control system to the second network location manager, the secure channel being configured to securely transmit intelligent network service control data from the first network service control system to the second network location manager, whereby intelligent network control services are provided to the second network.

24. The system of claim 23, wherein the second network location manager is configured to map a call control request received from the at least one second network IP telephony proxy server into a service control query to the first network service control system.

25. The system of claim 23, wherein the second network location manager is configured to map intelligent network service control data into an IP address when providing intelligent network control data to the at least one second network IP telephony proxy server.

26. The system of claim 23, wherein the at least one second network IP telephony proxy server is configured to process IP telephony session control messaging.

27. The system of claim 26, wherein the at least one second network IP telephony proxy server is configured to process IP telephony session control messaging in accordance with the Session Initiation Protocol (SIP).

28. The system of claim 26, wherein the at least one second network IP telephony proxy server is configured to process IP telephony session control messaging in accordance with the H.323 protocol.

29. The system of claim 23, wherein the secure channel comprises a logical data path between the first network call control system and the second network location manager.

30. The system of claim 23, wherein the secure channel comprises an IP security tunnel coupling the first network call control system and the second network location manager.

31. The system of claim 30, wherein the IP security tunnel is established using an authentication header protocol.

32. The system of claim 30, wherein the IP security tunnel is established using an encapsulating secure payload authentication header protocol.

33. The system of claim 30, wherein the IP security tunnel is established using a cryptographically hashed authentication protocol.

34. The system of claim 23, wherein the first network comprises a circuit switched network.

35. The system of claim 23, wherein the first network call control system comprises a legacy telephony service control system.

36. The system of claim 23, wherein the first network call control system comprises a service control point (SCP).

37. The system of claim 23, wherein the first network call control system includes a data access point (DAP).

38. The system of claim 23, wherein the intelligent network control services include virtual private network services.

39. The system of claim 23, wherein the intelligent network control services include 800-number network services.

40. A method for providing a second network with intelligent network service control data stored in a first network service control system, the method comprising:
receiving an IP telephony session initiation request at a second network IP proxy server;
determining if intelligent network service information is necessary to initiate the session;
transmitting the IP telephony session initiation request from the second network IP proxy server to a second network location manager if it is determined that intelligent network service information is necessary to initiate the session; and
creating a secure channel between the second network location manager and the first network service control system, the secure channel being configured to securely transfer the intelligent network service control data from the first network service control system to the second network location manager.

41. The method of claim 40, wherein the secure channel is created by establishing a logical data path between the first network service control system and the second network location manager.

42. The method of claim 40, wherein the secure channel is created by establishing an IP security tunnel between the first network service control system and the second network location manager.

43. The method of claim 42, wherein the IP security tunnel is established by encapsulating packets communicated between the first network service control system and the second network location manager using an authentication header protocol.

44. The method of claim 42, wherein the IP security tunnel is established by encapsulating packets communicated between the first network service control system and the second network location manager using an encapsulating secure payload authentication header protocol.

45. The method of claim 44, wherein the encapsulating secure payload authentication header protocol tunnel includes an enabled non-null encryption mode.

46. The method of claim 44, wherein the encapsulating secure payload authentication header protocol tunnel includes an enabled replay attack prevention mode.

47. The method of claim 42, wherein the IP security tunnel is established by encrypting packets communicated between the first network service control system and the second network location manager using a cryptographically hashed authentication protocol.

48. The method of claim 47, wherein the cryptographically hashed authentication protocol employs an MD5 hash algorithm.

49. The method of claim 40, further comprising the step of transmitting an intelligent network service control query from the second network location manager to the first network service control system in response to receiving the IP telephony session initiation request from the second network IP proxy server.

50. The method of claim 49, further comprising the step of transmitting an IP session control message from the second network location manager to the second network IP proxy server in response to a reply from the first network service control system.

51. The method of claim 40, wherein the first network call control system comprises a legacy telephony service control system.

52. The method of claim 51, wherein the second network call control system emulates a first network system such that communications between the legacy telephony service control system and the second network call control system are transparent to the legacy telephony service control system.

* * * * *